United States Patent
Rogalla

(10) Patent No.: US 9,453,777 B2
(45) Date of Patent: Sep. 27, 2016

(54) DEVICE FOR THE ATTACHMENT OF CORRECTION WEIGHTS FOR UNBALANCE CORRECTION

(71) Applicant: Schenck RoTec GmbH, Darmstadt (DE)

(72) Inventor: Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 246 days.

(21) Appl. No.: 14/324,456

(22) Filed: Jul. 7, 2014

(65) Prior Publication Data

US 2015/0027225 A1    Jan. 29, 2015

(30) Foreign Application Priority Data

Jul. 26, 2013  (DE) .................... 10 2013 108 048

(51) Int. Cl.
  *G01M 1/32*  (2006.01)
  *G01M 1/16*  (2006.01)
  *G01M 1/02*  (2006.01)

(52) U.S. Cl.
  CPC ............. *G01M 1/32* (2013.01); *G01M 1/02* (2013.01); *G01M 1/326* (2013.01)

(58) Field of Classification Search
  CPC ........ G01M 1/326; G01M 1/16; G01M 1/02; G01M 1/32; G01M 1/24
  USPC ............................ 73/468, 470, 462, 460, 487
  See application file for complete search history.

(56) References Cited

U.S. PATENT DOCUMENTS 4,780,593 A * 10/1988 Kato .................. G01M 1/32
                                                219/125.1
4,903,398 A *  2/1990 Sakamoto ............ G01M 1/32
                                                 29/703

(Continued)

FOREIGN PATENT DOCUMENTS

DE       602 07 476 T2   6/2006
DE    20 2008 002258 U1  7/2009

(Continued)

OTHER PUBLICATIONS

European Search Report in EP 14 17 8282, dated Feb. 17, 2015, with English translation of relevant parts.

*Primary Examiner* — Helen Kwok
(74) *Attorney, Agent, or Firm* — Collard & Roe, P.C.

(57) ABSTRACT

A device for the attachment of correction weights for unbalance correction to a rotary body includes a supply unit (15) for supplying individual correction weights, an attachment device (2) for applying the correction weights to the rotary body and including a first receptacle (6) for a first correction weight and a second receptacle (7) for a second correction weight, a feed unit (16) for feeding supplied correction weights to the receptacles (6, 7). The feed unit (16) includes a rotary feeder head (23) which has axially extending feeder elements (26, 27, 28, 29) arranged at a relative distance and forming a slideway (30) for the correction weights and having associated driving devices (34, 35) by which the correction weights are movable longitudinally to the feeder elements (26, 27, 28, 29), wherein in one position of the feeder head (23) a first feeder element (26, 27, 28, 29) is connectable to the first receptacle (6) of the attachment device (2) and a second feeder element (26, 27, 28, 29) is connectable to the second receptacle (7) of the attachment device (2).

15 Claims, 4 Drawing Sheets

(56) References Cited

U.S. PATENT DOCUMENTS

| | | | | |
|---|---|---|---|---|
| 5,992,232 | A * | 11/1999 | Saitoh | G01M 1/32 29/901 |
| 7,249,508 | B2 * | 7/2007 | Rogalla | G01M 1/32 73/468 |
| 8,336,379 | B2 * | 12/2012 | Rogalla | G01M 1/326 73/468 |
| 8,522,423 | B2 * | 9/2013 | Rogalla | G01M 1/32 29/714 |
| 8,561,464 | B2 | 10/2013 | Peinelt et al. | |
| 2002/0092351 | A1 * | 7/2002 | Horning | G01M 1/32 73/468 |
| 2002/0152811 | A1 * | 10/2002 | Gross | G01M 1/02 73/487 |
| 2003/0024309 | A1 * | 2/2003 | Loetzner | G01M 1/32 73/462 |
| 2003/0183003 | A1 | 10/2003 | Gross et al. | |
| 2005/0081627 | A1 | 4/2005 | Gross et al. | |
| 2006/0076359 | A1 | 4/2006 | Gross et al. | |
| 2010/0058859 | A1 * | 3/2010 | Rogalla | G01M 1/326 73/470 |
| 2010/0147458 | A1 | 6/2010 | Donnay et al. | |
| 2011/0283790 | A1 * | 11/2011 | Hedtke, Jr. | B26D 5/20 73/468 |
| 2015/0027225 | A1 * | 1/2015 | Rogalla | G01M 1/02 73/470 |

FOREIGN PATENT DOCUMENTS

| | | |
|---|---|---|
| DE | 10 2010 002 002 A1 | 8/2011 |
| DE | 10 2010 003 085 A1 | 9/2011 |

* cited by examiner

DEVICE FOR THE ATTACHMENT OF CORRECTION WEIGHTS FOR UNBALANCE CORRECTION

CROSS REFERENCE TO RELATED APPLICATIONS

Applicants claim priority under 35 U.S.C. §119 of German Application No. 10 2013 108 048.0 filed Jul. 26, 2013.

FIELD OF THE INVENTION

This invention relates to a device for attaching correction weights for unbalance correction to a rotary body to be balanced, comprising a supply unit capable of supplying individual correction weights in successive sequence, an attachment device intended and configured for applying the correction weights to a rotary body to be balanced and including a first receptacle for a first correction weight and a second receptacle for a second correction weight.

BACKGROUND OF THE INVENTION

The attachment of correction weights is a method for unbalance correction used primarily for the balancing of vehicle wheels. DE 10 2010 002 002 A1 discloses a fully automatic installation for the unbalance correction of vehicle wheels, in which any unbalance of the vehicle wheels is first measured in an unbalance measuring station, followed by feeding the vehicle wheels to a balancing station in which the correction weights, cut to size by an automatic cutting device on the basis of the measured values and provided with an adhesive layer, are adhesive-bonded to the vehicle wheels by means of an attachment device. To accomplish this, the attachment device includes an applicator head having two receptacles receiving two correction weights to enable these to be attached one after the other in two correction planes of the assigned vehicle wheel. To receive the correction weights, the applicator head is able to move up to the cutting device so closely that the correction elements can be loaded into the receptacles of the applicator head one after the other. As this occurs, the applicator head is rotated about a central axis so that even relatively long correction weights are uniformly inserted into their receptacles over their entire length, such that their rear surfaces rest against the applicator head.

In the known device, loading the applicator head with two correction weights is time-consuming because the correction weights are cut to length and loaded into the receptacles of the applicator head one after the other. Considering that the applicator head is unable to apply correction weights while being loaded, the loading time affects directly the cycle time for the continuous attachment of correction weights to a series of vehicle wheels.

SUMMARY OF THE INVENTION

It is an object of the present invention to provide a device for the attachment of correction weights for unbalance correction, which is characterized by involving little expenditure of time for loading the attachment device with correction weights.

According to the present invention, the device for applying correction weights for unbalance compensation to a rotary body to be balanced comprises a supply unit capable of supplying individual correction weights in successive sequence, and an attachment device intended and configured for applying the correction weights to a rotary body to be balanced and including a first receptacle for receiving a first correction weight and a second receptacle for receiving a second correction weight, further comprising a feed unit which is constructed to feed supplied correction weights to the receptacles of the attachment device and includes a movable feeder head which has at least two axially extending feeder elements arranged on the feeder head at a relative distance and forming a slideway for the correction weights, and driving devices associated with the feeder elements to enable the correction weights to be moved longitudinally to the feeder elements, wherein each of said feeder elements has a supply end connectable to the supply unit and a discharge end connectable to the receptacles of the attachment device, and movement of the feeder head enables the supply end to be connected to the supply unit and the discharge end to a receptacle of the attachment device, and wherein in at least one position of the feeder head a first feeder element is connectable with its discharge end to the first receptacle of the attachment device and a second feeder element is connectable with its discharge end to the second receptacle of the attachment device. The connection of the feeder elements to the supply unit and to the receptacles of the attachment device may be accomplished directly by abutting engagement or close approach of the mutual end surfaces, or alternatively, connection may also be established indirectly using interposed guiding elements which are stationary and may be arranged on the feed unit, for example.

The device of the invention enables two correction weights to be loaded into the two receptacles of the attachment device simultaneously by means of the feed unit. This allows halving of the time needed for loading the attachment device, thereby considerably reducing the cycle time required for a balancing operation. Accordingly, the two correction weights are supplied by the supply unit not simultaneously, but one after the other, being correspondingly transferred to the feed unit equally one after the other. Transfer of the correction weights to the feed unit may however take place within the time period in which the attachment device applies two previously received correction weights to a vehicle wheel. The cycle time for the complete attachment operation performed by means of the attachment device will be therefore affected by the supplying of the correction weights and the loading of the feed unit only if this operation takes longer than the attachment operation.

According to another proposal of the invention, the feeder head may be rotatable about an axis of rotation, and by rotating the feeder head the feeder elements are connectable either to the supply unit with their supply end or to a receptacle of the attachment device with their discharge end, wherein in at least one rotational angle position of the feeder head a first feeder element is connectable to the first receptacle of the attachment device with its discharge end, and a second feeder element is connectable to the second receptacle of the attachment device with its discharge end. This configuration allows economy of manufacture and a straightforward control of the sequence of movements.

Moreover, according to the invention the rotary feeder head of the feed unit may include three feeder elements spaced from each other at an angular distance of 120° relative to the axis of rotation of the feeder head, with the feeder head being movable into three rotational angle positions in which a respective one of the feeder elements has its supply end connected to the supply unit while the discharge ends of the two other feeder elements are connectable to the receptacles of the attachment device. This further development has the advantage that simultaneously with the loading of two correction weights into the receptacles of the attachment device by means of two feeder elements it is possible to transfer a new correction weight to the third feeder element for the subsequent attachment operation. Therefore, preparation of the next loading operation requires only the time period for supplying and transferring a correction weight to the feed unit, so that the time requirement for this operation is reduced, the next sequential loading of the attachment device can be performed at still greater speed, and, correspondingly, the cycle time can be reduced still further. Another advantage of this arrangement is that the feeder head invariably needs to be rotated only over arcs of equal size, that is, 120°.

In another advantageous embodiment of the invention, the rotary feeder head may include four feeder elements spaced from each other at an angular distance of 90°, with the feeder head being movable into four rotational angle positions in which a respective one of the feeder elements is connectable to the supply unit with its supply end while two other feeder elements are connectable to the receptacles of the attachment device with their discharge ends. This configuration of the feed unit affords the same advantages with regard to a short cycle time as the configuration comprising three feeder elements. An added advantage of this configuration is that the feeder elements simultaneously connectable to the receptacles of the attachment device may be arranged opposite one another in a plane containing the axis of rotation. This is particularly advantageous for the configuration of the feeder elements and the connection of the feeder elements to the receptacles of the attachment device.

According to the invention, the driving device for moving the correction weights along the feeder elements may include a pusher movable in the longitudinal direction of a feeder element by means of a pneumatic, hydraulic or electrical actuator. Depending on the configuration of the feed unit and its feeder elements, the pushers of the driving device may be movable in a straight motion or be rotatable about an axis of rotation. In a preferred embodiment of the invention, the slideway for the correction weights of each feeder element is curved about a curvature axis askew relative to the axis of rotation of the feeder head, with the driving device including a pusher pivotal about a pivot axis, its pivot axis coinciding with the curvature axis of the slideway of that particular feeder element that has its discharge end connected to one of the receptacles of the attachment device.

The curved configuration of the feeder elements is advantageous for the connection of the feeder elements to the receptacles of the attachment device on the one hand and to the supply unit on the other hand. It enables furthermore an economically feasible configuration of the driving device which requires no mounting space on the side of the feed unit close to the supply unit.

When the correction weights are made of a magnetic material or contain magnetic components, according to the invention the feeder elements may be provided with magnetic retaining means enabling the correction weights to be slidably held in the slideway. To guide the correction weights, the feeder elements may include guide ribs laterally bounding the slideway. In the event that the correction weights cannot be held by magnetic means, the feeder elements are provided with an undercut guide profile enabling positive engagement by the correction weights.

In order to enable unimpeded transfer of the correction weights from the slideway into the receptacle of the attachment device, it is necessary for the discharge ends of the feeder elements connected to the receptacles to be accurately aligned with the receptacles. To accomplish this, the invention may provide locating means on the discharge ends of the feeder elements, which cooperate with mating locating means on the receptacles of the attachment device.

According to the invention, the attachment device may include an applicator head rotary about an axis and mounting the receptacles for the correction weights. The receptacles may be arranged on the applicator head in two planes spaced from each other normal to the axis of the applicator head, said two planes corresponding to the two planes in which unbalance correction can be performed by means of the correction weights. Furthermore, the applicator head may be mounted on the jointed arm of a robot and be movable up to the body to be balanced, for example, a vehicle wheel, by controlled movement of the jointed arm.

BRIEF DESCRIPTION OF THE DRAWINGS

The present invention will be explained in more detail with reference to an embodiment illustrated in the accompanying drawing. In the drawing.

DETAILED DESCRIPTION OF THE DRAWINGS

Figure 1:
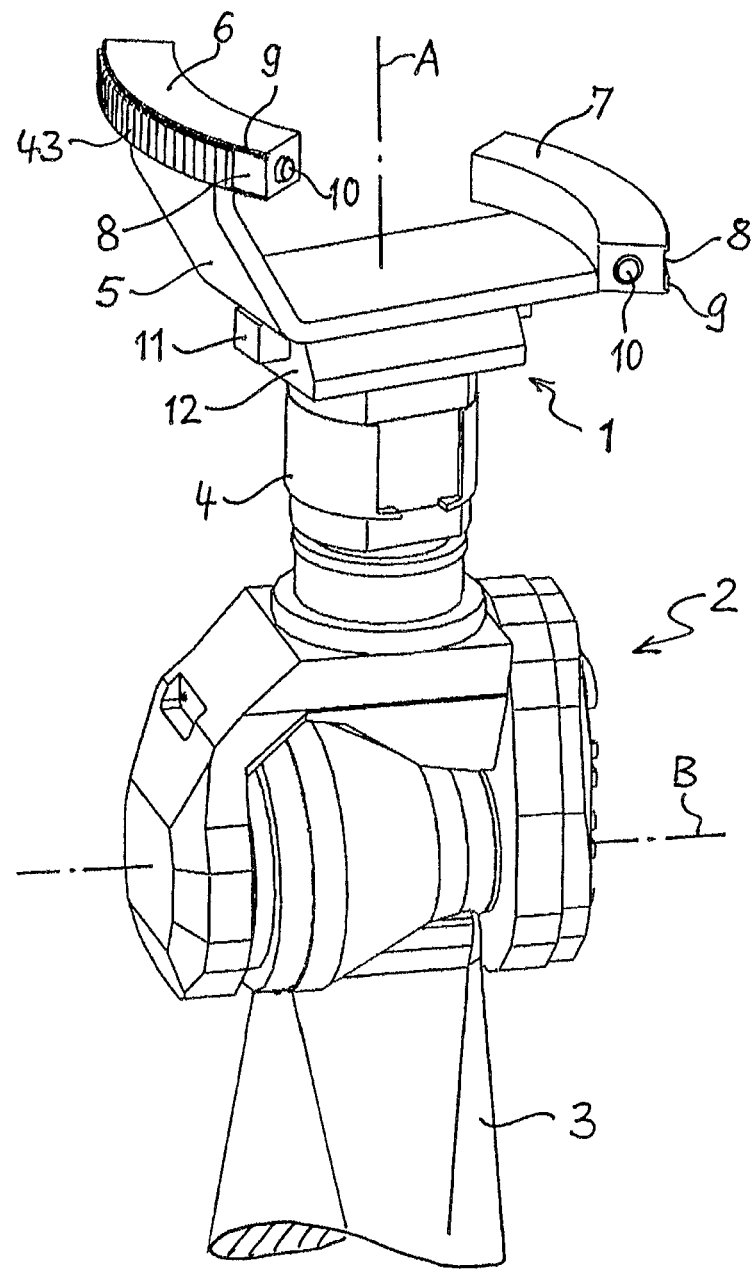
FIG. 1 is a perspective view of a portion of an attachment device of the invention.

FIG. 1 shows an applicator head 1 of an attachment device 2 for applying correction weights to the inside of the rim of a vehicle wheel. The applicator head 1 is rotary about an axis of rotation A and mounted for movement about an axis B intersecting it at right angles on the end of a jointed arm 3 of a manipulating robot by means of a quick-release coupling 4, being movable by means of the jointed arm 3 to a feed unit for receiving correction weights and to a vehicle wheel to be balanced for attachment of the correction weights. The applicator head 1 has a support 5 extending in a direction transverse to the axis of rotation A and mounting at its opposite ends receptacles 6, 7 for receiving correction weights. Each of the receptacles 6, 7 is comprised of a bent rail of rectangular cross-section with a convex curved surface 8 on the outside of the rail facing away from the axis of rotation A. Arranged on the curved edges of the curved surface 8 at a constant distance from one another are outwardly protruding guide ribs 9 providing a lateral guiding function for correction weights arranged on the curved surface 8. The receptacles 6, 7 have at their frontal ends frustoconical projections 10 serving as locating means.

The support 5 is fastened to a slide 11 and movably carried thereby on the applicator head 1 in a slide guideway 12 in a direction transverse to the axis of rotation A. The slide 11 is held in a mid-position by the force of centering springs. By overcoming the force of the centering springs, it is possible for the slide 11 with the support 5 to travel in both directions relative to the applicator head 1 in a plane containing the axis of rotation A and intersecting the receptacles 6, 7 in the middle between the end surfaces. The displaceability against spring force facilitates generation and control of a minimum pressure force when attaching the correction weights to the body to be balanced. Control of the applicator head 1 then does not have to be force control but may be position-related, which is an advantage. Moreover, proximity switches enable a check to be made to see whether the slide travels a sufficiently wide distance on attachment of a correction weight in order to tense the spring in accordance with the required pressure force.

The support 5 is shaped in the form of a rectangular plate including on a narrow side an arm bent at an angle of 45°, approximately, and mounting a receptacle 6. The other receptacle 7 is mounted on the narrow side of the support 5 opposite the arm. In this manner, the two receptacles 6, 7 lie in two different planes normal to the axis of rotation A and spaced from each other. This ensures that the two receptacles 6, 7 do not interfere with each other when the correction weights are attached. The distance between the receptacles 6, 7 and the axis of rotation A is smaller than half the inner diameter of the rim to which the applicator head 1 is assigned.

The receptacles 6, 7 are configured to hold correction weights of a magnetizable material. Accordingly, they are magnetic. The magnetic effect may be accomplished by a plurality of permanent magnets embedded in bores in the curved surfaces 8 of the receptacles 6, 7. The magnetic effect causes the correction weights to be urged against the curved surfaces 8 of the receptacles 6, 7 where they are securely held until their attachment to the rim. The correction weights are attached by adhesive bonding. For this purpose, the side of the correction weights facing away from the curved surface 8 is provided with an adhesive layer. When it is desired to attach other shapes of correction weights, the applicator head 1 may be detached from the jointed arm 3 at the interface provided by the quick-release coupling 4 to be replaced by another suitable applicator head.

Figure 2:
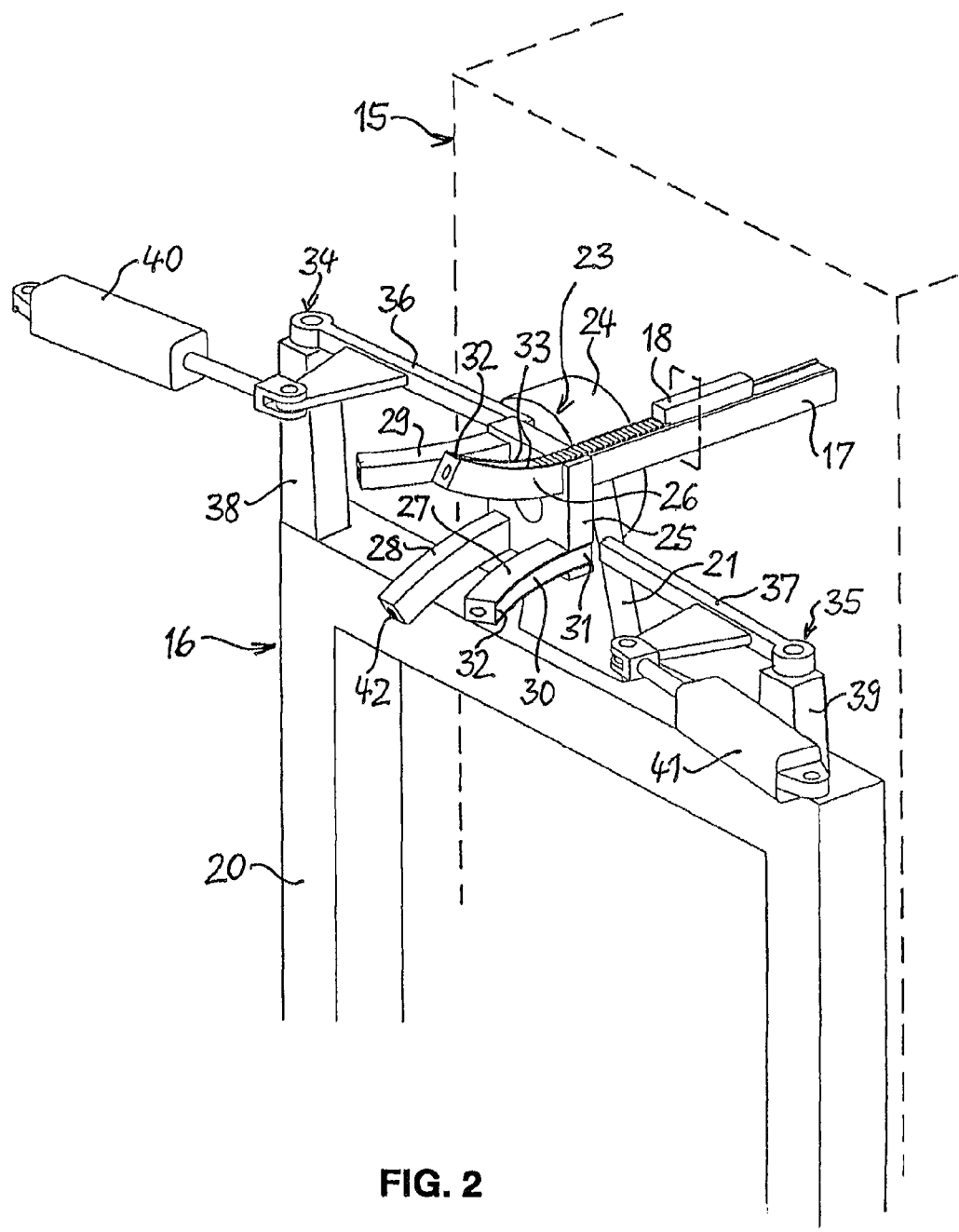
FIG. 2 is a perspective view of a supply unit and a feed unit of the invention.

FIG. 2 shows a supply unit 15 and a feed unit 16 arranged thereon. The supply unit 15 is configured to produce correction weights to the individual size required for balancing by severing them from a length of supply and supplying them to the feed unit 16 via a feed rail 17. The supply unit 15 is controlled by a control device controlling the cutoff length of the individual correction weights in dependence upon the measuring signals of an unbalance measuring station, such that their weight has the proper size required for balancing. The severed correction weights are then supplied one after the other on a feed rail 17 and transferred to the feed unit 16 by means of a pusher 18.

The feed unit 16 includes a frame 20 arranged adjacent to the supply unit 15 and having a bearing support 21 rotatably mounting a feeder head 23. Also mounted on the bearing support 21 is a motor 24 enabling the feeder head 23 to be rotated. The feeder head 23 includes a square plate 25 having attached to it the respective ends of four rod-shaped feeder elements 26, 27, 28, 29 arranged equidistantly from the axis of rotation of the feeder head 23 lying in the center of the plate 25 and at uniform distances from each other. The feeder elements 26 to 29 resemble each other and are arranged axially symmetrically so that on a rotation of the feeder head 23 through an angle of 90° each feeder element occupies the space of the feeder element preceding it in the direction of rotation. Each feeder element 26 to 29 is shaped in the manner of a bent rail forming with its concave side a slideway 30 for correction weights. The feeder elements 26 to 29 are secured to the edge of the plate 25 in such a manner that the slideway 30 extends fully through the plate 25 and the feeder elements 26 to 29 form on the side of the plate 25 facing the supply unit 15 a supply end 31 for the supply of correction weights. On the side of the plate 25 facing away from the supply unit 15, the feeder elements 26 to 29 extend in the direction of the axis of rotation, and as a result of their curvature their distance from the axis of rotation increases with increasing distance from the plate 25. The free ends of the feeder elements 26 to 29 spaced from the plate 25 form discharge ends 32 intended for connecting the feeder elements 26 to 29 to the receptacles 6, 7 of the applicator head 1.

In order to keep the correction weights slidable in the slideways 30 of the feeder elements 26 to 29, the feeder elements 26 to 29 are provided with permanent magnets, similar to the receptacles 6, 7 of the applicator head 1. The feeder elements 26 to 29 further include guide ribs 33 laterally bounding the slideways 30 for guiding the correction weights in the longitudinal direction of the slideways 30.

For feeding correction weights which cannot be held magnetically, the feeder elements 26 to 29 may be provided with guiding means guiding the correction weights by positive engagement, using, for example, lateral guide ribs reaching over the lateral edge of the correction weights.

The frame 20 also mounts two driving devices 34, 35 serving to move correction weights along the feeder elements 26 to 29. Each of the driving devices 34, 35 includes a respective pusher 36, 37 pivotal about a pivot axis and carried on a respective bearing bracket 38, 39. The pushers 36, 37 are pivotable by a respective actuator 40, 41 configured as a double-acting pneumatic cylinder supported on the frame 20. The pivot axes of the pushers 36, 37 are parallel and coincide with the curvature axes of the two slideways 30 of those feeder elements which are in the transfer position connectable to the applicator head 1. In the transfer position of the feeder head 23 shown in FIG. 2, these are the feeder elements 27 and 29.

The feed unit 16 is arranged on the supply unit 15 in such a way that the feed rail 17 ends on the plane in which the supply ends 31 of the feeder elements 26 to 29 are. The feed rail 17 and the feeder head 23 are 1 aligned relative to each other such that in the transfer position of the feeder head 23 one feeder element not connectable to the applicator head 1 in this position, in FIG. 2 the feeder element 26, is situated opposite the end of the feed rail 17, such as to enable the pusher 18 of the supply unit 15 to push a supplied correction weight into the slideway 30 of the feeder element 26. In this way it is possible to supply a new correction weight to the feed unit 16 simultaneously with the transfer of correction weights to the applicator head 1 of the attachment device 2.

Figure 3:
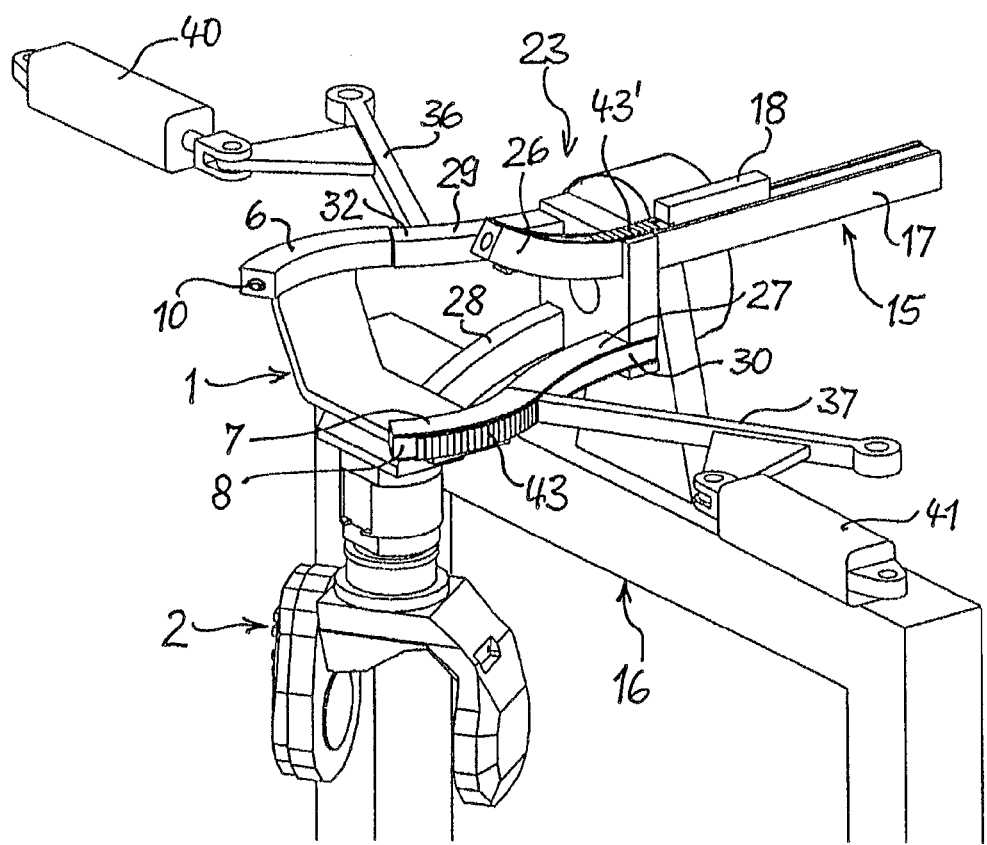
FIG. 3 is a perspective view of the feed unit during the process of loading the applicator head of the attachment device with correction weights.

FIG. 3 shows the feed unit 16 in the transfer position for the transfer of two correction weights to the applicator head 1 at an instant of time at which the transfer operation is not as yet fully completed. The applicator head 1 with the receptacles 6, 7 is in abutting engagement with the discharge ends 32 of the feeder elements 27, 29 in such a way that the curved surfaces 8 of the receptacles 6, 7 adjoin the slideways 30 of the feeder elements 27, 29 in direct and stepless manner. Serving for accurate alignment of the receptacles 6, 7 of the applicator head 1 relative to the feeder elements 27, 29 are the projections 10 which are arranged at the ends of the receptacles 6, 7 and engage into mating bores 42 in the end surfaces of the free ends of the feeder elements 26 to 29. During transfer, the actuators 40, 41 operate to cause the pushers 36, 37 to push the correction weights 43—of which only one is shown in the drawing—held in the slideways 30 out of the slideways 30 into the receptacles 6, 7. The working stroke of the pushers 36, 37 is adjusted by means of stops on the actuators 40, 41 in such a way that on completion of the transfer operation the ends of the correction weights 43 abutting the pushers 36, 37 are flush with the ends of the receptacles 6, 7. The position of the correction weights 43 transferred is thus unambiguously defined in relation to the applicator head 1 and can be used as basis in the calculation of the attachment position of the applicator head relative to the vehicle wheel to be balanced. While the correction weights 43 are being transferred to the applicator head 1, the supply unit 15 can load a new correction weight 43' into the slideway of the feeder element 26.

The transfer operation is completed when the correction weights 43 are fully inserted into the receptacles 6, 7 and the new correction weight 43' has been fed. Under control of the actuators 40, 41, the pushers 36, 37 are then returned to the initial position shown in FIG. 2. The feeder head 23 is then rotated through 180° about its axis to enable the supply unit to load a second weight into the feeder element 28. Once this has happened, the feeder head 23 is again rotated through an angle of 90°, causing the feeder elements 26, 28 containing new correction weights to be moved into the position ready for transfer to the applicator head. Upon completion of the attachment of the correction weights performed during this period by means of the applicator head 1, the latter can be again moved up to the feed unit 16 and coupled to the feeder elements 26, 28 of the feeder head 23 for receiving the new correction weights 43'.

Figure 4:
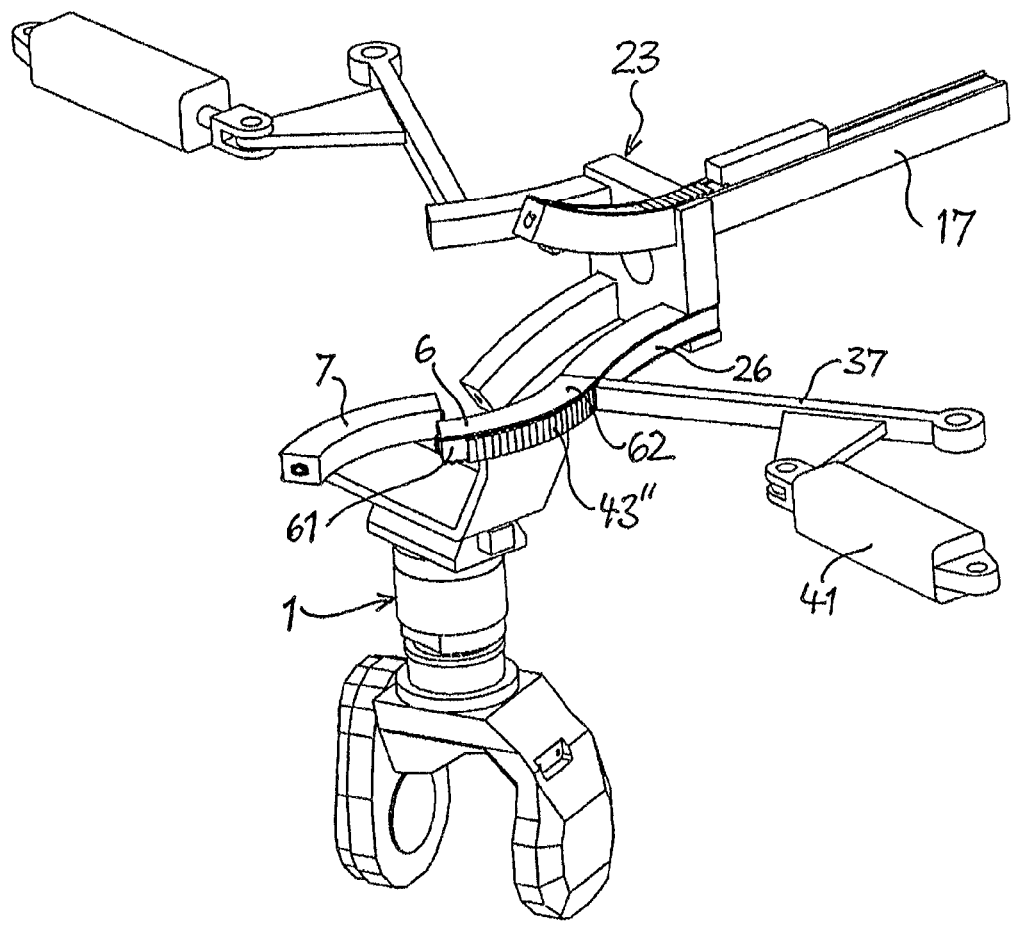
FIG. 4 is a perspective view of the feed unit during the process of loading the second part of a two-part correction weight.

FIG. 4 shows a transfer situation for an application in which design reasons regarding the position in the vehicle wheel intended for application of a correction weight dictate that the correction weight be made of two parts which are to be attached to the vehicle wheel at a defined distance to each other and in the same balancing plane. Since the plane usually involved in this case is the balancing plane lying at a deeper level in the rim dish, only the same receptacle 6 of the applicator head 1 can be considered for attachment of the two weight parts. To be able to attach the two weight parts at the proper relative distance, a first step comprises loading the receptacle 6 with the first weight part by the feed unit 16 from the one side, as shown in FIG. 3. The attachment position of the first weight part is therefore determined by the first end 61 of the receptacle 6 abutting the feeder element.

After the first weight part is attached, transfer of the second weight part comprises moving the second end 62 of the receptacle 6 against the feeder element 26 by rotating the applicator head 1 through 180° to a correspondingly vertically offset position, and pushing the second weight part 43" by means of the pusher 37 out of the feeder element 26 into the receptacle 6 until its rear end is flush with the end 62. Considering that the second end 62 of the receptacle 6 then determines the position of the second weight part relative to the applicator head 1, it is thus possible for the second weight part 43" to be applied to the vehicle wheel at an accurately predeterminable distance from the first weight part, regardless of its length.

What is claimed is:

1. A device for an attachment of correction weights for unbalance correction to a rotary body to be balanced, comprising
a supply unit capable of supplying individual correction weights in successive sequence,
an attachment device intended and configured for applying the correction weights to the rotary body to be balanced and including a first receptacle for a first correction weight and a second receptacle for a second correction weight,
a feed unit which is constructed to feed supplied correction weights to the receptacles of the attachment device and includes a movable feeder head which has at least two feeder elements extending from the feeder head at a relative distance, each one of the feeder elements forming a slideway for the correction weights, and
driving devices associated with the feeder elements to cause the correction weights to be movable longitudinally to the feeder elements, wherein each of said feeder elements has a supply end connectable to the supply unit and a discharge end connectable to the receptacles of the attachment device, and movement of the feeder head enables either the supply end to be connected to the supply unit or the discharge end to be connected to one of the receptacles of the attachment device, and wherein in at least one position of the feeder head a first one of the feeder elements is connectable with the discharge end of the first one of the feeder elements to the first receptacle of the attachment device and a second one of the feeder elements is connectable with the discharge end of the second one of the feeder elements to the second receptacle of the attachment device.

2. The device according to claim 1 wherein the feeder head is rotatable about an axis of rotation, and by rotating the feeder head the feeder elements are connectable either to the supply unit with the supply ends of the feeder elements or to a receptacle of the attachment device with the discharge ends of the feeder elements, and wherein in at least one rotational angle position of the feeder head, a first one of the feeder elements is connectable to the first receptacle with the discharge end of the first one of the feeder elements, and a second one of the feeder elements is connectable to the second receptacle with the discharge end of the second one of the feeder elements.

3. The device according to claim 2 wherein the rotatable feeder head includes three feeder elements spaced from each other at an angular distance of 120°, with the feeder head being movable into three rotational angle positions in which a respective one of the feeder elements has the respective supply end of the respective one of the feeder elements connected to the supply unit while the discharge ends of the two other ones of the feeder elements are connectable to the receptacles of the attachment device.

4. The device according to claim 2 wherein the feeder head includes four feeder elements spaced from each other at an angular distance of 90°, with the feeder head being movable into four rotational angle positions in which a respective one of the feeder elements has the respective supply end of the respective one of the feeder elements connected to the supply unit and two other ones of the feeder elements are connectable to the receptacles of the attachment device with their discharge ends.

5. The device according to claim 1 wherein each of the driving devices includes a respective pusher movable in a longitudinal direction of a feeder element by means of a pneumatic, hydraulic or electrical actuator.

6. The device according to claim 5 wherein the slideway for the correction weights of each feeder element is curved about a curvature axis askew relative to an axis of rotation of the feeder head, and wherein each of the driving devices includes a respective pusher pivotal about a pivot axis coinciding with a curvature axis of the slideway of that particular feeder element that is connectable with the discharge end of that particular feeder element to one of the receptacles of the attachment device.

7. The device according to claim 1 wherein the feeder elements include magnetic retaining means for slidably holding the correction weights in the slideway.

8. The device according to claim 1 wherein the slideways of the feeder elements include apertures connected to a source of vacuum for enabling a vacuum to be generated on the slideways for slidably holding the correction weights.

9. The device according to claim 1 wherein the feeder elements include guide ribs laterally bounding the slideway.

10. The device according to claim 1 wherein a locating device is provided on the discharge ends of the feeder elements, which cooperate with the receptacles of the attachment device.

11. The device according to claim 1 wherein the attachment device includes an applicator head rotary about an axis and mounting the receptacles for the correction weights.

12. The device according to claim 11 wherein the receptacles are arranged on the applicator head in different planes spaced from each other normal to the axis.

13. The device according to claim 11 wherein the applicator head is mounted on a jointed arm of a robot and is movable up to the rotary body to be balanced by controlled movement of the jointed arm.

14. The device according to claim 13 wherein the applicator head is mounted on the jointed arm of the robot by means of a quick-release coupling.

15. The device according to claim 11 wherein the applicator head is carried in a slide guideway and is movable in the slide guideway from a mid-position in a direction transverse to an axis of rotation in opposition to a force of centering springs.

* * * * *